March 31, 1936. H. C. WILL Re. 19,912

SANCTUARY LAMP

Original Filed Aug. 6, 1931

INVENTOR
Howard C. Will
BY
Denison & Thompson
ATTORNEYS

WITNESS
J. T. Mains

Reissued Mar. 31, 1936

Re. 19,912

UNITED STATES PATENT OFFICE 19,912

SANCTUARY LAMP

Howard C. Will, Syracuse, N. Y., assignor to Will & Baumer Candle Co., Inc., Syracuse, N. Y., a corporation of New York Original No. 1,974,375, dated September 18, 1934, Serial No. 555,447, August 6, 1931. Application for reissue July 1, 1935, Serial No. 29,367

6 Claims. (Cl. 240—13)

This invention relates to a new and improved sanctuary lamp.

In lamps of this character heretofore commonly used there has been provided a ring or follower of substantial weight which is placed on and rests on the top of the candle itself, and which moves downwardly by gravity as the candle is consumed, and forms a receptacle for melted candle material at or above the upper end of the candle and a ventilating chimney for the candle.

The main object of this invention is to provide a sanctuary lamp of such a construction that the ring or follower may be dispensed with, without losing any of the effectiveness of the lamp, by utilizing a combined chimney and receptacle wall formed of glass or other suitable transparent or translucent material, and which is perhaps preferably colored red and extends from near the lower end of the candle to a point some distance above the upper end of the candle, and surrounds the candle throughout substantially its entire length to form an annular chamber around the candle, with the upper end of the receptacle wall tapering inwardly above the candle to provide a ventilating chimney supported entirely independently of the candle.

My invention further contemplates the provision of a base of cup-shaped formation for receiving the bottom of the candle and the bottom of the chimney, the cup-shaped base having side walls of sufficient heighth to retain the melted candle material within the cup when the candle has burned downwardly to its lower end and is substantially entirely in a molten condition.

Figure 1:
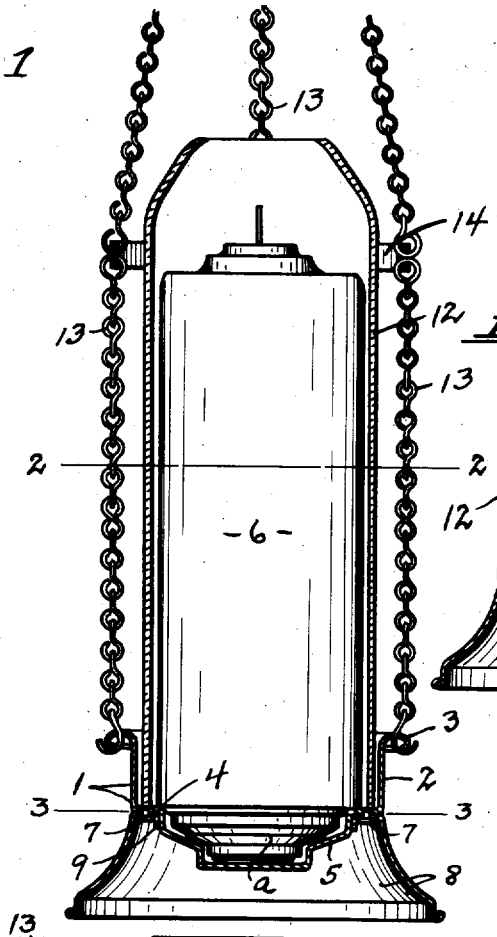
Figure 4:
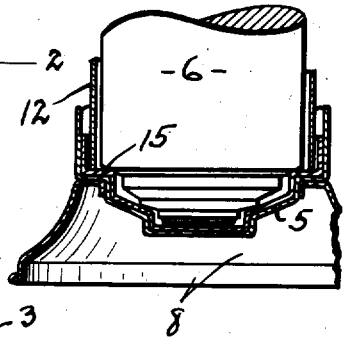
Figure 2:
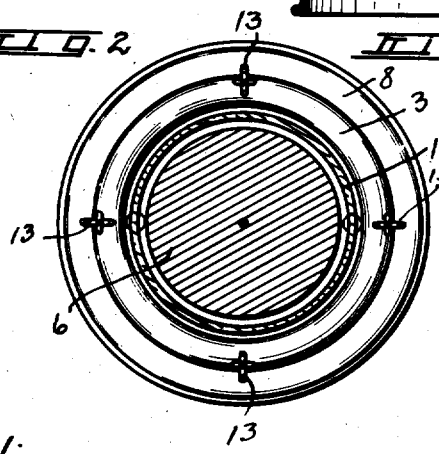
Figure 3:
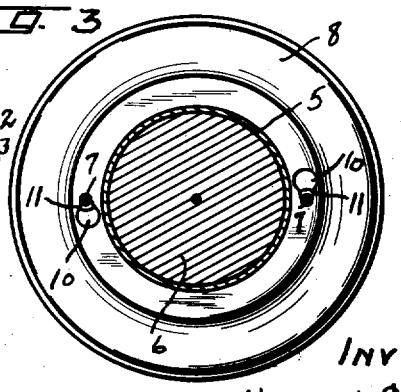

Figure 1 is a longitudinal sectional view of a device embodying the various features of this invention, and illustrating a candle mounted therein;

Figures 2 and 3 are horizontal sectional views taken respectively on lines 2—2 and 3—3 of Figure 1; and Figure 4 is a detail longitudinal sectional view of the base portion of a sanctuary lamp illustrating a modified form of my invention.

My lamp comprises a main base 1 preferably circular in shape and preferably made of metal although other materials may be employed if desired.

The main base 1 includes an upstanding collar 2 ending at its upper end in an outwardly flaring annular lip 3.

At the lower end of collar 2 is an inwardly extending circular flange or shelf 4. Depending from shelf 4 is a circular stepped metallic base section 5 adapted to receive the bottom end a of a candle 6. The parts so far described may be integrally formed.

On the under side of flange 4, I provide a pair of depending headed pins 7. A circular sub-base 8 having an outwardly and downwardly curved wall has at its upper end an internal annular flange 9.

In the flange 9, I provide a pair of opposed apertures 10 of a size to permit the passage therethrough of the heads of the pins 7. Each aperture 10 has in communication therewith, a slot 11 smaller in width than the diameter of the heads on the pins 7, but sufficiently wide to receive the shanks of the pins 7.

To assemble the sub-base 8 on the main base 1, the headed pins 7 are passed through the apertures 10 and the sub-base 8 is then rotated a sufficient distance to bring the shanks of the pins 7 into the slots 11.

An open-ended tubular receptacle wall and chimney 12 preferably of glass or other suitable transparent or translucent material, has its lower end inside of the collar 2 and is supported on the flange or shelf 4 so as to form with the inner edge of the flange and the base section 5 a receptacle entirely surrounding the candle.

The upper end of chimney 12 extends a short distance above the upper end of candle 6, and is tapered inwardly so that the aperture in the upper end is somewhat less in diameter than the diameter of the candle 6 to form a ventilating chimney.

For the purpose of providing a means whereby my sanctuary lamp may be suspended, I provide four chains 13, having their lower ends engaged in spaced apertures in lip 3 and extending upwardly above the upper end of chimney.

Although I have not here shown the same, I prefer to have the upper ends of all of the chains engaged with a ring or hook.

Just beneath the upper end of chimney 12, I provide a ring or collar 14 with which the chains 13 are engaged.

The diameter of the collar 14 is preferably approximately the same as the diameter of the lip 3 so that the lower portions of the chains 13 will be in parallel relation to the chimney 12. The collar 14 is not only a spacer for the chains 13, but it also will prevent lateral displacement of the chimney 12 when the device is handled or moved.

During the burning of the candle 6, a certain amount of melted wax will overflow from the top of the candle 6 and will flow downwardly between the candle 6 and the receptacle wall 12, the same being in spaced relation, and will be eventually consumed. When the candle burns down to and the flame approaches its lower end, substantially the entire remaining portion of the candle will be in a molten state due to the heat of the candle flame. The depth of the molten candle material will depend, to a certain extent, upon the outside air temperature. A certain portion of the molten candle material may seep between the bottom of the chimney and the annular shelf 4 of the cup. The side walls 2 of the cup are made of sufficient height to retain this candle material within the cup should this seepage occur, even though the candle is burned under the most extreme atmospheric temperature conditions.

Referring to Figure 4, it is sometimes desirable to provide a removable supplementary cup 15 seated in the base 5 to make the device more easily cleanable, although such cup is not necessarily required.

The supplementary cup 15 is preferably of sufficient height to retain whatever molten candle material may seep beneath the chimney even when the candle is burned under high temperature air conditions.

An important feature of my invention is the simple way in which the desired result is obtained. The device consists of but two parts—a base and a glass tube with a restricted upper end which forms a chimney. These two parts form a receptacle in which a candle is supported and wholly inclosed, and also provide a glass receptacle or sump to retain melted wax as the candle is consumed, and a cup portion to take care of any seepage beneath the chimney.

It will be seen that my improved sanctuary lamp has fewer parts than the ordinary lamp of this character, and the parts can be economically manufactured and assembled.

It is also much more attractive in appearance in that the unsightly follower of the ordinary lamp of this character is dispensed with.

I have here shown a specific arrangement and form and relation of parts, but it will be understood that the main object of my invention is to provide a sanctuary lamp in which the ordinary ring or follower is dispensed with, and it will also be understood that to accomplish this result, various changes may be made in the form, shape and relation of parts without departing from the invention as called for in the appended claims.

I claim:

1. A sanctuary lamp comprising a base having a recess in the bottom thereof, a chimney seated in the base, a plurality of suspension chains positioned outside the chimney and secured to the base in spaced relation, a spacing ring secured to the chain in a plane intermediate the ends of said chimney and in spaced relation to the chimney, and a candle seated in the base and inside the chimney.

2. In a sanctuary lamp, in combination, a preformed candle, a holder, means for mounting the candle in the holder and a chimney mounted in the holder and extending upwardly concentric with the candle, said candle and said chimney being but slightly spaced from each other whereby as the candle burns, the melted portion of the candle flows into the space around the candle and is retained by the chimney near the burning portion of the candle to form a cup of melted material bounded by the circumference of the chimney.

3. In a sanctuary lamp in combination, a preformed candle, a cup-shaped holder adapted to receive the candle, a chimney seated on the holder and extending upwardly concentric and in close spaced relationship with the candle whereby as the candle burns, the melted candle material is retained in a pool by the side walls of the chimney near the burning portion of the candle and as the candle burns downwardly, it is retained by the cup and substantially the entire candle is consumed during the burning thereof.

4. In a sanctuary lamp, a cup-shaped base for supporting a preformed candle, a chimney mounted on the base and extending upwardly concentric with the candle, a plurality of supporting chains secured to the base, a ring secured to the chains adjacent the top of the chimney and arranged to retain the chains in spaced relationship with the chimney, and a sub-base removably secured to the base.

5. A light of the class described comprising a hollow translucent casing, an elongated solid fuel candle body disposed within the casing in such proximity to the wall thereof throughout substantially the entire length of the body that the casing retains a pool of melted fuel material on top of the remaining solid fuel during the burning thereof, the casing being open at the bottom, and a cup device telescopingly receiving said open bottom end portion of the casing and having an imperforate wall extending upwardly exteriorly of the lower margin of the casing wall and terminating upwardly close to the level defined by the level of the fuel in the casing when all the remaining fuel in the casing has reached a molten condition as a result of the heat of the flame of the light under surrounding conditions in which the light is utilized, whereby the melted fuel will be prevented from escaping and flowing onto surfaces on which the light may be supported.

6. In a sanctuary lamp, in combination, a preformed, solid candle member, a diaphanous member substantially surrounding the candle member, one of said members being movable into and out of assembled relationship with the other when the candle member is in a solid condition, a base for supporting said members, said members being in sufficiently close relationship that as the candle burns, a downwardly moving pool of melted candle material is retained by the walls of said diaphanous member at the top of the candle member, said diaphanous member being open at the bottom, and a cup-shaped base for receiving the bottom of the candle and the bottom of the diaphanous member, said cup-shaped base being of a depth such that the upper margin thereof extends above the level of the fuel in the diaphanous member when all the remaining fuel retained by the diaphanous member has reached a molten condition as a result of the heat of the flame of the candle under surrounding conditions in which the lamp is utilized, whereby the melted fuel will be prevented from escaping and flowing onto surfaces upon which the lamp may be supported.

HOWARD C. WILL.